United States Patent Office 3,808,151
Patented Apr. 30, 1974

3,808,151
METHOD OF ACTIVATING THE HYDROTREATING CATALYST FOR PETROLEUM FRACTIONS
Takahiko Yamazi and Sinji Takase, Kawasaki, Japan, assignors to Nippon Oil Company, Limited, Minato-ku, Tokyo, Japan
No Drawing. Continuation of abandoned application Ser. No. 32,441, Apr. 27, 1970. This application July 7, 1972, Ser. No. 272,906
Claims priority, application Japan, May 2, 1969, 44/33,700
Int. Cl. B01j *11/74*
U.S. Cl. 252—439          11 Claims

ABSTRACT OF THE DISCLOSURE

Method of activating the hydrotreating catalyst for petroleum fractions which comprises contacting a silica-alumina or alumina catalyst carrying molybdenum or tungsten as a component of the active metals either following or simultaneously with the sulfurization with a halogenated hydrocarbon containing fluorine at a temperature from 100° to 600° C. to give a fluorine content in the catalyst from 0.1 to 25% by weight.

---

This is a continuation of application Ser. No. 32,441, filed Apr. 27, 1970 and now abandoned.

BACKGROUND OF THE INVENTION

(1) Field of the invention

This invention relates to a method of activating the hydrotreating catalyst for petroleum fractions. More particularly, it relates to a method of activating the hydrotreating catalyst for petroleum fractions comprising introducing into the catalyst mainly fluorine by contacting a silica-alumina or alumina catalyst carrying molybdenum or tungsten as a component of the active metals either following or simultaneously with the sulfurization with a halogenated hydrocarbon containing fluorine.

(2) Description of the prior art

Prior to this invention there have been used in most cases as the hydrotreating catalyst for petroleum fractions those consisting of a carrier composed of at least one of oxides of metals of Groups II, III and IV of the Periodic Table such as, for example, silica-alumina, silica-magnesia or alumina carrying at least one of metals of Groups VI*b* and/or VIII of the Periodic Table. These catalysts are capable of catalyzing hydrocracking or hydrotreating of petroleum fractions. As the hydrocracking catalyst are used those consisting of active metals such as cobalt-molybdenum, nickel-tungsten, nickel, cobalt or tungsten carried on silica-alumina, silica-magnesia or alumina carrier. As the hydrotreating catalyst are mainly used those consisting of active metals such as cobalt-molybdenum, nickel-cobalt-molybdenum, iron-cobalt-molybdenum or nickel-tungsten carried on alumina or silica-alumina carrier.

In general, the catalytic hydrocracking process can be applied to a wide scope of petroleum fractions from naphtha through kerosene and gas oil to residual oil and it is believed that the cracking reaction is associated with desulfurization and denitrogenation reactions thereby enabling yield of products of high purities. However, as the cracking activities of the hydrocracking catalysts as mentioned above are not necessarily satisfactory, investigations have been made of catalysts with higher cracking activities. As a result, it was found that fluorination treatment of the hydrocracking catalyst improved the cracking activity. It is well known that the carrier in the hydrocracking catalyst such as silica-alumina, silica-magnesia or alumina generally plays the main role in the cracking reaction, namely, it is the cracking component. It is also known that introduction of fluorine into these carriers results in improvement in the cracking activity. Although the fluorination treatment is known to be effective for improving the cracking activity, the treatment of the catalyst itself involves many difficulties, and every prior method of the treatment is defective in some respects. Various methods of fluorination treatment of the hydrocracking catalyst are heretofore employed including (1) introduction of fluorine into the carrier by dipping silica-alumina or alumina carrier in hydrofluoric acid, an aqueous solution of ammonium fluoride or the like, followed by drying and calcing, and then, introducing thereon the active metal carried by dipping or a similar means, (2) introduction of fluorine by the treatment of silica-alumina hydrogel with ammonium fluoride on its ion-exchange with metals such as nickel, (3) simultaneous introduction of fluorine and active metals carried by dipping silica-alumina xerogel in a solution containing nickel, tungsten and fluorine and (4) so-called kneading or mixing method for simultaneous introduction of active metals and fluorine carried by dipping silica-alumina hydrogel in a solution containing the active metals and fluorine. The methods under (1) to (4) above are the so-called dipping methods, which are disadvantageous in the following respects: In the methods (1), (2) and (3), the volume of porosity and surface area of the carrier are reduced by the fluorination treatment so that it is necessary to increase the concentration of active metals in the aqueous solution in order to introduce the active metals carried on the carrier by dipping and still it is difficult to introduce the metals carried. Moreover, the desired improvement in the cracking activity is not satisfactory. In the method (4), it is well possible for the active metal component and fluorine not to be homogeneously distributed due to the use of kneading. Alternatively, the halogenation in gaseous phase is also employed. The method of treatment involves contacting a catalyst such as active metal-carrying silica-alumina with a halogenated hydrocarbon containing fluorine in gaseous phase at an elevated temperature to introduce fluorine into the catalyst. For example, the fluorination treatment by contacting a catalyst of a metal of the platinum group carried on a refractory oxide with a halogenated hydrocarbon is known to be effective. However, the gas-phase halogenation treatment has not been in practical use with catalysts using as an active metal component a metal of Group VI*b* of the Periodic Table such as tungsten or molybdenum because of a critical disadvantage that the metal of Group VI*b* will react with the halogenated hydrocarbon in the halogenation treatment to form a metal halogenide being volatile even at ordinary temperature with a result that the active metal component will be eliminated from the carrier under the treatment conditions at higher temperatures. In this respect, gas-phase halogenation treatment of the hydrocracking catalyst has not been investigated especially with metals of Group VI*b* of the Preiodic Table as an active metal component due to association of the very unfavorable phenomenon of volatilization of the active metal.

SUMMARY OF THE INVENTION

The object of the invention is the provision of a novel method of activating the hydrotreating catalyst for petroleum fractions characterized by introducing into the catalyst mainly fluorine with almost no volatilization of the active metal component, which comprises contacting a silica-alumina or alumina catalyst carrying at least tungsten or molybdenum as the active metal component either following or simultaneously with the sulfurization with a halogenated hydrocarbon containing fluorine. Thus, the invention has overcome the disadvantages which have been considered to be difficult to solve.

More particularly, this invention is concerned with a method of activating the hydrotreating catalyst for petroleum fractions which comprises contacting a silica-alumina or alumina carrier carrying active metal component consisting of at least a metal of Group VIa of the Periodic Table such as molybdenum or tungsten, said active metal component having been introduced by dipping or another method followed by drying and baking, either following or simultaneously with the sulfurization, with a halogenated hydrocarbon containing fluorine at a temperature from 100° to 600° C., preferably from 150° to 400° C. to give a fluorine content in the catalyst from 0.1 to 25% by weight. Whereas, as described above, in the prior methods it was impossible to subject silica-alumina or alumina catalysts to halogenation treatment in gaseous phase at an elevated temperature, it has been surprisingly found that remarkable improvement in the catalytic activity is effected according to the present invention with introduction fluorine thereinto as well as with almost no volatilization of the active metal component and no loss of sulfurizing effect by contacting the said catalyst, either following or simultaneously with the conventional sulfurization with hydrogen sulfide alone or a mixed gas of hydrogen and hydrogen sulfide conducted at a temperature from 200° to 600° C., with a halogenated hydrocarbon containing fluorine.

The sulfurization process as referred to herein includes, in addition to the sulfurization with hydrogen sulfide mentioned above, those with sulfides conventionally employed in the art such as sulfurization of said catalyst with an oil incorporated with a sulfur compound such as carbon disulfide, a mercaptan or a thiophene. In the cases with carbon disulfide, mercaptans and thiophenes it is preferred to carry out the fluorination treatment with a halogenated hydrocarbon following the sulfurization. Combined use of hydrogen as a diluent is also preferable. The halogenated hydrocarbon containing fluorine used in this invention is hydrocarbon compounds in which one or more hydrogens are substituted with fluorine or fluorine and other halogens, and representative are, for example, $CF_4$, $CHF_3$, $CH_2F_2$, $CHClF_2$, $CClF_3$, $CCl_2F$, $CClF_2$—$CClF_2$, $C_6H_5F$, $CF_3I$, $CF_2HBr$ and the like. The fluorination treatment according to this invention is desirably carried out at a temperature from 100° to 600° C., preferably from 150° to 400° C. and under normal or elevated pressure. At temperatures below 100° C. it is difficult to introduce into said catalyst the predetermined amount of fluorine. On the other hand, at temperatures above 600° C. formation of halogenides of the carried active metals is so much accelerated that volatilization of the active metals will become vigorous or will crystallize the active metal component to cause loss of the activity with unfavorable results.

As set forth earlier, the method of activation in accordance with this invention involves fluorination treatment of the carrier by contacting the catalyst consisting of a carrier carrying active metals, either following or simultaneously with the sulfurization with a halogenated hydrocarbon containing fluorine or with a mixed gas of a halogenated hydrocarbon containing fluorine and a gaseous sulfide such as hydrogen sulfide, which includes, for example, (1) contact of said catalyst following the sulfurization by a conventional method such as, for example, sulfurization with hydrogen sulfide, with a halogenated hydrocarbon containing fluorine, (2) simultaneous sulfurization, for example, with hydrogen sulfide and contact with a halogenated hydrocarbon containing fluorine, and (3) contact with a mixed gas of a halogenated hydrocarbon containing fluorine and a gaseous sulfide such as hydrogen sulfide. The method of activating the hydrogenation catalyst for petroleum fractions according to this invention may also be applied to the hydrotreating catalyst for lubricating oil fractions. Heretofore, investigations have been made of so-called hydrotreating of the lubricating oil, which involves a series of reactions such as formation of polynuclear naphthenes under more vigorous reactions conditions by the use of a hydrotreating catalyst with cracking capacity added and selective hydrocracking of the polynuclear naphthenes simultaneously yielding mononuclear naphthenes and isomerized paraffins. It has been found that the activation of catalyst according to the method of this invention is also highly effective upon activation of such a sort of catalysts. Catalysts consisting of a carrier such as silica-alumina carrying active metals such as cobalt-molybdenum, nickel-cobalt-molybdenum, iron-cobalt-molybdenum or nickel-tungsten are usually considered to be useful as the hydrotreating catalyst for lubricating oil. Use of the method of activation according to this invention has been found to produce such advantages as improvement in the cracking activity, and simultaneous acceleration of hydrogenation and isomerization reactions with a result that lubricating oils with a high viscosity index and good color and stability to oxidation. Moreover, according to the method of this invention, the carrier of alumina alone, the acidity of which is increased by the introduction of fluorine into the carrier by means of a halogenated hydrocarbon, exerts a satisfactory cracking-catalyzing activity as well as hydrogenation- and isomerization-catalyzing activities.

As described above, the method of activation according to this invention is valuable especially in the use in the treatment step where the hydrotreating catalyst for petroleum fractions needs the cracking reaction.

DESCRIPTION OF PREFERRED EMBODIMENTS

The invention will be described in greater detail in conjunction with the following specific examples.

EXAMPLE 1

In an aqueous solution of 7.2 g. of nickel nitrate hexahydrate and 18.7 g. of silicotungstic acid in 150 ml. of pure water was dipped 50 g. of commercial silica-alumina ($SiO_2$: 75%, $Al_2O_3$: 25%) for 30 min. The dipping solution was removed by filtration and the dipped catalyst was dried at a temperature of 120° C. for 24 hours followed by calcining in air at 500° C. for 5 hours. The product was analyzed for Ni and W respectively being 1.6% and 15% by weight. The silica-alumina catalyst carrying nickel-tungsten (called catalyst A herein below) was subjected to sulfurization by contacting the same with hydrogen sulfide at a flow rate of 160 l./hr. at a temperature of 350° C. for 1 hour. After the sulfurization the temperature was reduced to 250° C. at which temperature the resulting catalyst was contacted with a mixed gas of hydrogen sulfide and $CF_2Cl_2$ (trade name Freon 12) at 250° C. for 30 min., flow rate of the mixed gas being 160 l./hr. and concentration of $CF_2Cl_2$ being 4.5% by volume. After the fluorination treatment the catalyst was further contacted with hydrogen sulfide at a flow rate of 160 l./min. at 250° C. for 30 min. The catalyst (called catalyst I herein below) was analyzed for F, Cl, Ni and W respectively to find in percent by weight: F, 4.85; Cl, 0.23; Ni, 1.6; W, 14.4. The volatilizing ratio of tungsten was calculated by the following equation: Volatilizing rate of W=[{W after the carriage of active metals (percent by weight)−W after the final treatment (percent by weight)}/W after the carriage of active metals (percent by weight)]×100.

According to the above equation, the volatilizing ratio of tungsten was calculated to be 4%.

EXAMPLE 2

In an aqueous solution of 4.9 g. of nickel nitrate hexahydrate and 12.8 g. of phosphotungstic acid in 103 ml. of pure water were dipped 50 g. of commercial silica-alumina ($SiO_3$: 75%, $Al_2O_3$: 25%) for 30 min. The dipping solution was removed by filtration and the dipped catalyst was dried at a temperature of 120° C. for 24 hours followed by calcining in air at 500° C. for 5 hours. The resulting catalyst was analyzed to find in percent by weight: Ni, 1.6; W, 15. The silica-alumina catalyst carrying tungsten (called catalyst B herein below) was sulfurized by contacting the same with hydrogen sulfide at a flow rate of 160 l./hr. at a temperature of 350° C. for 30 min. and then subjected to fluorination treatment under hydrogen sulfide incorporated with $CF_4$ at a concentration of 5% by weight at 350° C. for 30 min. The resulting catalyst was analyzed to find in percent by weight: F, 12.6; Cl, 0.511; Ni, 1.6; W, 14.9. The volatilizing ratio of tungsten was 0.67%.

EXAMPLE 3

The catalyst B prepared in Example 2 was simultaneously subjected to sulfurization and fluorination treatments by contacting the same with a mixed gas of hydrogen sulfide and $CHClF_2$ at a $CHClF_2$ concentration of 5% by volume and at a mixed gas flow rate of 160 l./hr. at 200° C. for 40 min. The resulting catalyst was analyzed to find in percent by weight: F, 9.1; Cl, 0.1; Ni, 1.6; W, 14.3. The volatilizing ratio of tungsten was 4.7%.

EXAMPLE 4

Commercial nickel-tungsten-alumina catalyst containing 4% by weight of Ni and 16% by weight of W was simultaneously subjected to sulfurization and fluorination treatments by contacting the same with a mixed gas of hydrogen sulfide and $CHF_3$ at a $CHF_3$ concentration of 4% by volume and a mixed gas flow rate of 150 l./hr. at 300° C. for 20 min. The resulting catalyst was analyzed to find in percent by weight: F, 9.7; Ni, 4; W, 15.2. The volatilizing ratio of tungsten was 5%.

EXAMPLE 5

Commercial cobalt-molybdenum-alumina catalyst containing 3% by weight of Co and 8.3% by weight of Mo and carrying the cobalt and molybdenum in the form of oxide (called catalyst C hereinbelow) was subjected to sulfurization by contacting the same with a mixed gas of hydrogen and hydrogen sulfide at a hydrogen sulfide concentration of 5% by volume and at a flow rate of 160 l./hr. at 300° C. for 3 hours. Then, the fluorination was made with a mixed gas of hydrogen sulfide and $CClF_2$—$CClF_2$ at a $CCl_2$—$CCl_2$ concentration of 10% by volume at 300° C. for 15 min. The resulting catalyst (called catalyst II hereinbelow) was analyzed to find in percent by weight: F, 4.9; Co, 3; Mo, 10.1 The volatilizing ratio of molybdenum was 0.8%.

EXAMPLE 6

The catalyst A prepared in Example 1 was sulfurized by contacting the same with a mixed gas of hydrogen and hydrogen sulfide at a flow rate of 160 l./hr. and at a hydrogen sulfide concentration of 15% by volume at 400° C. for 30 min., followed by reduction under hydrogen at a flow rate of 136 l./hr. for 30 min. The sulfurized catalyst was contacted with $CClF_3$ at a flow rate of 8 l./hr. at 230° C. for 3 min. and then with hydrogen sulfide at a flow rate of 160 l./hr. for 5 min. The procedure was repeated five times, thus the contact time of the catalyst with $CClF_3$ being totally 15 min. The catalyst after the halogenation treatment was analyzed to find in percent by weight: F, 3.2; Ni, 1.6; W, 14. The volatilizing ratio of tungsten was 6.7%.

EXAMPLE 7

The catalyst A was sulfurized under the same conditions as in Example 6 followed by reduction with hydrogen and then fluorination treatment by contact with $C_6H_5F$ at a flow rate of 10 l./hr. at a temperature of 230° C. for 30 min. The resulting catalyst (called catalyst III hereinbelow) was analyzed to find in percent by weight: F, 3.1; Ni, 1.6; W, 13.1. The volatilizing ratio of tungsten was 12.7%.

EXAMPLE 8

In a solution of 5.8 g. of ammonium metatungstate in 53 ml. of pure water were dipped 25 g. of commercial silica-alumina ($SiO_2$: 75%, $Al_2O_3$, 25%) for 1 hour. After removal of the solution the residue was dried at 120° C. for 24 hours followed by calcing at 500° C. for 5 hours. The catalyst was analyzed to find a content of tungsten to be 13.2% by weight. The catalyst was sulfurized by contacting the same with a mixed gas of hydrogen and hydrogen sulfide at a $H_2S$ concentration of 10% by volume and a mixed gas flow rate of 160 l./hr. at 300° C. for 2 hours and then subjected to fluorination treatment by contacting the resulting mass with a mixed gas of hydrogen sulfide and $CF_3I$ at $CF_3I$ concentration of 5% by volume and a mixed gas flow rate of 160 l./hr. at 250° C. for 45 min. The resulting catalyst was then reduced under hydrogen at a flow rate of 100 l./hr. at 300° C. for 30 min. The catalyst (called catalyst IV hereinbelow) was analyzed for F to be 9.1% by weight. The volatilizing ratio of tungsten was 5%.

REFERENTIAL EXAMPLE 1

The same catalyst A as in Example 1 was subjected to fluorination treatment with $CCl_2F_2$ at a flow rate of 8 l./hr. at 250° C. for 20 min. followed by sulfurization by contacting with a mixed gas of hydrogen and hydrogen sulfide at a hydrogen sulfide concentration of 5% by volume and at a flow rate of 160 l./hr. for 2 hours. The resulting mass was then reduced by contacting the same with hydrogen at a flow rate of 150 l./hr. for 30 min. The catalyst was analyzed to find a content of F to be 4.7% by weight. The volatilizing ratio of tungsten was 50%.

REFERENTIAL EXAMPLE 2

The same commercial cobalt-molybdenum-alumina catalyst (catalyst C) as in Example 5 was subjected to fluorination treatment by contacting the same with $CHF_3$ at a flow rate of 8 l./hr. at 300° C. for 30 min. The catalyst after the fluorination treatment (called catalyst V hereinbelow) was analyzed to find in percent by weight: F, 4.5; Co, 3; Mo, 1.6. The volatilizing ratio of molybdenum was 81%.

REFERENTIAL EXAMPLE 3

The catalyst A used in Example 1 was subjected to fluorination treatment by contacting the same with $CHCl_2$ at a flow rate of 8 l./hr. at 350° C. for 20 min. There were formed a lot of yellowish brown or green crystals at the lower temperature area attached to the reaction vessel. The catalyst after the fluorination treatment (called catalyst VI hereinbelow) was analyzed to find in percent by weight: F, 15.1; Cl, 0.74; Ni, 1.5; W, 4.5. The volatilizing ratio of tungsten was 60.5%.

As shown in Examples 1–8, the method of activating the hydrotreating catalyst for petroleum fractions according to this invention is highly effective for producing the silica-alumina or alumina carrier mainly carrying fluroine with almost no volatilization of metals of Group VIb of the Periodic Table such as tungsten and molybdenum. On the other hand, as shown in Referential Examples 1–3, the fluorination treatment with a halogenated hydrocarbon at least containing a fluorine alone, in place of the halogenation treatment either following or simultaneously, with the sulfurization, gives rise to so much volatilization of the tungsten and molybdenum that the fluorination treatment produces rather adverse influence upon the catalyst.

EXAMPLE 9

Estimation of hydrocracking activity

An autoclave experiment was made using 20 g. of the catalyst II prepared in Example 5. As the starting oil were used 200 g. of distillate obtained by vacuum distillation of crude petroleum oil from Sumatra, nitrogen 440 p.p.m., sulfur content of 0.16% by weight. The reaction conditions were: Temperature 405°–410° C.; pressure 100 kg./cm.$^2$ g. (hydrogen pressure at the reaction temperature); number of rotation 1000 r.p.m.; reaction time 40 min. Characters of the liquid product oil after the treatment are shown in Table 1.

TABLE 1

Characters of the oil after the treatment

Yield of liquid light oil up
to 340° C.:                55 vol. percent (° C.)
    Fractionation character:
        Initial fraction _____ 87
        5 vol. percent _____ 123
        10 vol. percent _____ 149
        20 vol. percent _____ 194
        30 vol. percent _____ 243
        40 vol. percent _____ 284
        50 vol. percent _____ 314

EXAMPLE 10

Estimation of hydrocracking activity

An autoclave experiment was made using 20 g. of the catalyst IV prepared in Example 8. As the starting oil was used 200 g. of waxy oil obtained by deasphalting crude petroleum oil from Sumatra, hydrogenated oil containing nitrogen 40 p.p.m. and sulfur 0.01% by weight. The reaction conditions were: Temperature 380° C.; pressure 80 kg./cm.$^2$ g.; reaction time 1 hour. The yield of liquid light fractions up to 300° C. of the oil after the treatment was 65% by volume.

Similar results were obtained with the catalysts prepared in Examples 2, 3 and 4 by the method according to this invention.

REFERENTIAL EXAMPLE 4

Estimation of hydrocracking activity

Twenty grams of the commercial cobalt-molybdenum-alumina catalyst (catalyst C) with no fluorination treatment applied, which was used in Example 5, were sulfurized by contacting with a mixed gas of hydrogen and hydrogen sulfide at a flow rate of 160 l./hr. and at a hydrogen sulfide concentration of 5% by volume at 300° C. for 3 hours. The resulting mass was reduced under hydrogen at a flow rate of 152 l./hr. for 1 hour. A hydrocracking experiment was made using the catalyst of the same starting oil under the same reaction conditions as in Example 9. The yield of liquid light fractions up to 350° C. of the oil after the treatment was 30% by volume.

REFERENTIAL EXAMPLE 5

A hydrocracking experiment in autoclave was made using 20 g. of the fluorinated catalyst (catalyst V) prepared in Referential Example 2 of the same starting oil as in Example 9. The reaction conditions were the same as in Example 9. The yield of liquid light fractions up to 350° C. of the oil after the treatment was 11% by volume.

As shown in Examples 9 and 10, the catalysts prepared according to the activation method of this invention exert better cracking activities than the catalyst with the halogenation treatment only applied as shown in Referential Example 5 and also evidently better cracking activities than the catalyst with no halogenation treatment but with sulfurization treatment only applied as shown in Referential Example 4.

EXAMPLE 11

Hydrotreating of lubricating oil

A hydrogenation experiment in autoclave was made using 10 g. of the catalyst I prepared in Example 1 of dewaxed distillate obtained by vacuum distillation of crude petroleum oil from Khurusanya as the starting oil.

Properties of the starting oil is shown in Table 2. The reaction conditions were: Temperature 400° C.; pressure 100 kg./cm.$^2$; number of rotation 1000 r.p.m.; time 40 min. Properties of the oil after the treatment is shown in Table 3.

TABLE 2

Properties of the starting oil

Viscosity:
    At 37.8° C. _____ cst__ 118.6
    At 98.9° C. _____ cst__ 9.728
Viscosity index _____ 53
Sulfur content _____ wt. percent__ 3.31
Nitrogen _____ p.p.m__ 530

TABLE 3

Properties of the oil after the treatment

Yield of liquid fractions above 350° C. _____
                                         vol. percent__ 48.5
Viscosity
    At 37.8° C. _____ cst__ 43.01
    At 98.9° C. _____ cst__ 6.008
Viscosity index _____ 90
Sulfur content _____ wt. percent__ 0.16

EXAMPLE 12

Hydrotreating of lubricating oil

A hydrogenation experiment in autoclave of lubricating oil was made using 20 g. of the catalyst III prepared in Example 7 and the same starting oil as in Example 11 under the same conditions as in Example 11. Properties of the oil after the treatment is shown in Table 4.

TABLE 4

Properties of the oil after treatment

Yield of liquid fractions above 350° C. _____
                                         vol. percent__ 52.5
Viscosity
    At 37.8° C. _____ cst__ 42.27
    At 98.9° C. _____ cst__ 5.794
Viscosity index _____ 81
Sulfur content _____ wt. percent__ 1.33

Similar results were produced using the catalyst prepared in Example 6.

REFERENTIAL EXAMPLE 6

A hydrogenation experiment in autoclave of lubricating oil was made using 20 g. of the catalyst VI prepared in Referential Example 3 and the same starting oil as in Example 10 under the same reaction conditions as in Example 10. Properties of the oil after the treatment is shown in Table 5.

TABLE 5

Properties of the oil after treatment

Yield of liquid fractions above 350° C.
                                         vol. percent__ 75
Viscosity
    At 37.8° C. _____ cst__ 79.02
    At 98.9° C. _____ cst__ 7.836
Viscosity index _____ 60
Sulfur content _____ wt. percent__ 2.04

As shown in Examples 11 and 12, use of the catalyst according to the activation method of this invention results in remarkable improvement in the viscosity index of the resulting lubricating oil and the high desulfurizing activity of said catalyst are also apparent. On the other hand, as shown in Referential Example 6 use of the catalyst only with the gas-phase fluorination treatment applied exhibits little improvement in the viscosity index and a very low activity of the desulfurization.

The data in the above examples clearly indicate great advantages of the activation method according to this invention.

We claim:

1. A method of activating a catalyst useful for hydrotreating petroleum fraction which comprises sulfurizing a catalyst consisting essentially of
   (a) one member selected from the group consisting of silica-alumina and alumina, and
   (b) at least one member selected from the group consisting of molybdenum, tungsten, and a combination consisting of at least one member selected from the group consisting of molybdenum and tungsten and at least one member selected from the group consisting of iron, cobalt, and nickel as a component of the active metals, with a sulfurization reagent; and thereafter contacting the resulting catalyst with a fluorinated halogenated hydrocarbon at a temperature of from 100° to 600° C. to provide a fluorine content of from 0.1% to 25% by weight in the resulting catalyst.

2. A method of activating a catalyst useful for hydrotreating petroleum fraction which comprises simultaneously contacting a catalyst consisting essentially of
   (a) one member selected from the group consisting of silica-alumina and alumina, and
   (b) at least one member selected from the group consisting of molybdenum, tungsten, and a combination consisting of at least one member selected from the group consisting of molybdenum and tungsten, and at least one member selected from the group consisting of iron, cobalt, and nickel as a component of the active metals, with a sulfurization reagent, and with a fluorinated halogenated hydrocarbon at a temperature of from 100° to 600° C. to provide a fluorine content of from 0.1% to 25% by weight in the resulting catalyst.

3. The method of claim 1 wherein the sulfurization reagent is selected from the group consisting of hydrogen sulfide gas, a mixed gas of hydrogen and hydrogen sulfide, and an oil incorporated with carbon disulfide, mercaptan or thiophene.

4. The method of claim 2 wherein the sulfurization reagent is selected from the group consisting of hydrogen sulfide gas, a mixed gas of hydrogen and hydrogen sulfide, and an oil incorporated with carbon disulfide, mercaptan or thiophene.

5. The method of claim 3 wherein the sulfurization is carried out at a temperature of from 200° C. to 600° C.

6. The method of claim 1 wherein the halogenated hydrocarbon is selected from the group consisting of $CF_4$, $CHF_3$, $CH_2F_2$, $CHClF$, $CClF_3$, $CCl_2F_2$, $CClF_2-CClF_2$, $C_6H_5F$, $CF_3I$, and $CF_2HBr$.

7. The method of claim 2 wherein the halogenated hydrocarbon is selected from the group consisting of $CF_4$, $CHF_3$, $CH_2F_2$, $CHClF$, $CClF_3$, $CCl_2F_2$, $CClF_2-CClF_2$, $C_6H_5F$, $CF_3I$, and $CF_2HBr$.

8. The method of claim 1 wherein the sulfurization is carried out by using hydrogen sulfide gas, a mixed gas of hydrogen and hydrogen sulfide, or an oil incorporated with carbon disulfide, mercaptan or thiophene at a temperature of from 200° C. to 600° C. and the flourination is carried out by using $CF_4$, $CHF_3$, $CH_2F_2$, $CHClF_2$, $CClF_3$, $CCl_2F_2$, $CClF_2-CClF_2$, $C_6H_5F$, $CF_3I$, or $CF_2HBr$ at a temperature of from 100° C. to 600° C.

9. The method of claim 2 wherein the catalyst is simultaneously contacted with hydrogen sulfide gas, a mixed gas of hydrogen and hydrogen sulfide, or an oil incorporated with carbon disulfide, mercaptan or thiophene and with $CF_4$, $CHF_3$, $CH_2F_2$, $CHClF_2$, $CClF_3$, $CCl_2F_2$, $CClF_2-CClF_2$, $C_6H_5F$, $CF_3I$ or $CF_2HBr$ at a temperature of from 100° C. to 600° C.

10. The method of claim 1 wherein said catalyst contains tungsten and said halogenated hydrocarbon is $CF_2Cl_2$.

11. The method of claim 2 wherein said catalyst contains tungsten and said halogenated hydrocarbon is $CF_2Cl_2$.

References Cited
UNITED STATES PATENTS

| | | |
|---|---|---|
| 3,422,001 | 1/1969 | Kouwenhoven et al. _ 252—439 X |
| 3,078,238 | 2/1963 | Beuther et al. _____ 252—439 |
| 2,793,170 | 5/1957 | Stiles et al. _____ 252—439 X |
| 3,144,414 | 8/1964 | Silverman _____ 252—439 X |

PATRICK P. GARVIN, Primary Examiner

U.S. Cl. X.R.

208—111, 112